(No Model.)
A. M. PLUMB.
ROCK DRILL.
No. 568,698. Patented Sept. 29, 1896.
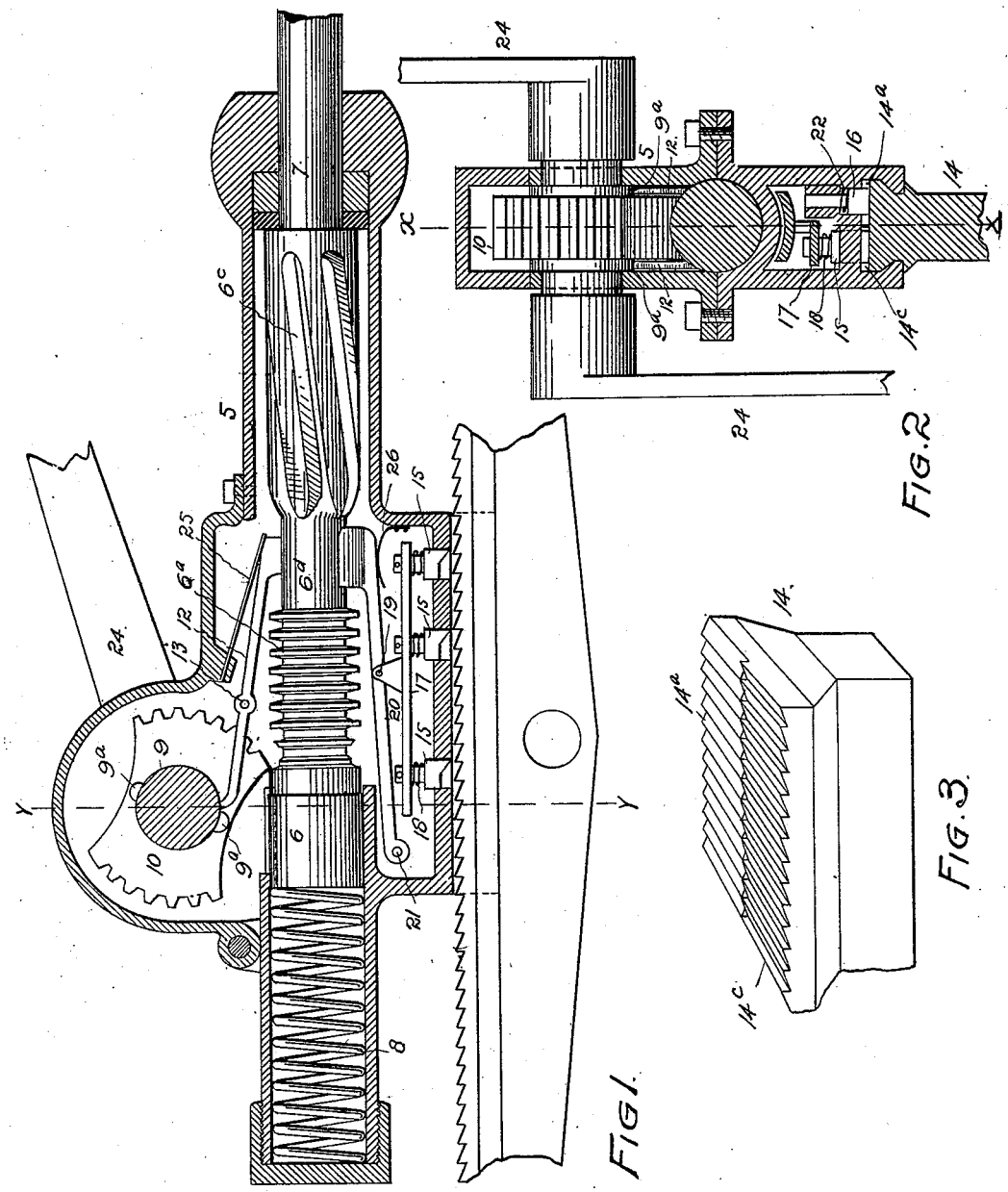
Witnesses
Inventor
A. M. Plumb.
By his Attorney

UNITED STATES PATENT OFFICE.

ALBERT M. PLUMB, OF DENVER, COLORADO.

ROCK-DRILL.

SPECIFICATION forming part of Letters Patent No. 568,698, dated September 29, 1896.

Application filed April 25, 1896. Serial No. 589,146. (No model.)

*To all whom it may concern:*

Be it known that I, ALBERT M. PLUMB, a citizen of the United States of America, residing at Denver, in the county of Arapahoe and State of Colorado, have invented certain new and useful Improvements in Rock-Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in rock-drills; and it consists of the features, arrangements, and combinations hereinafter described and claimed, all of which will be fully understood by reference to the accompanying drawings, in which is illustrated an embodiment thereof.

In the drawings, Figure 1 is a vertical longitudinal section taken through the machine on the line $x\,x$, Fig. 2. Fig. 2 is a vertical cross-section taken on the line $y\,y$, Fig. 1. Fig. 3 is a fragmentary perspective view of the rack-bar, shown on a larger scale.

Similar reference-characters indicate corresponding parts in the views.

Let the numeral 5 designate the casing inclosing the reciprocatory plunger 6, whose shank 7 carries the drill-bit. (Not shown.) Also located in the casing and engaging the rear extremity of the plunger is a coil-spring 8. Journaled in the upper part of the casing, above the plunger, and occupying a position transverse thereto, is a shaft 9, carrying a mutilated gear 10, whose cogged segments engage a series of circumferential ribs $6^a$, formed on the plunger. The cogs of the gear dip into the grooves between the ribs.

Forward of the ribbed part $6^a$ the plunger is provided with spiral grooves $6^c$, which are engaged by a lever 12, fulcrumed on the casing, as shown at 13. As the plunger moves backward the forward extremity of the lever engages a spiral groove and imparts a partial rotary movement to the plunger. As soon as the gear releases the plunger a cam $9^a$ on the shaft 9 engages the rear extremity of the lever 12 and raises the opposite extremity out of the spiral groove. Hence the plunger makes the forward stroke uninfluenced by the lever 12, and consequently without any rotary action. The shaft 9 is provided with two cams $9^a$. As the plunger moves backward it compresses the coil-spring 8. The recoil of this spring drives the plunger forward.

The casing 5 is slidingly supported on a rack-bar 14, having two ratchet-faces $14^a$ and $14^c$. The teeth of these faces are oppositely inclined to engage two sets of dogs 15 and 16, respectively. The necks of the dogs 15 engage apertures formed in a small bar 17, cross-pins being inserted in the extremities of the necks above the bar. Between the bar and the shoulders on the dogs are located coil-springs 18. Attached to the bar 17 at 19 is a lever 20, located just below the plunger and fulcrumed on the casing, as shown at 21. Between the parts $6^a$ and $6^c$ of the plunger is a part $6^d$, of less diameter. When the plunger is at its forward limit of movement, the forward extremity of the lever 20, as well as that of the lever 12, engages this reduced part $6^d$. As the plunger is drawn backward the part $6^c$ thereof engages the forward extremity of the lever 20 and depresses said lever sufficiently to force the dogs 15 into the notches of the ratchet-face $14^a$. This engagement prevents the casing 5 from moving forward on the rack-bar until the lever 20 is released from contact with the part $6^c$ of the plunger, and this release does not occur until just before the plunger reaches its forward limit of movement. As soon as the lever 20 is released from pressure a suitable spring 26 returns it to its normal position and lifts the dogs 15 out of the teeth of the ratchet-face $14^a$. The casing is then at liberty to move forward on the rack-bar.

The dogs 16 engage apertures formed in the bottom of the casing and engage the teeth of the ratchet-face $14^c$. Each of these dogs is held in engagement with said ratchet-teeth by gravity and a suitable spring 22, located between a shoulder on the dog and a stationary shoulder or stop on the casing. The dogs 16 normally lock the casing against backward movement on the rack-bar. While only one dog 16 is shown in the casing, it should be assumed that there are several of these dogs, as in the case of the dogs 15. A plurality of dogs of either kind is not indispensable, since a single dog of each kind will make the construction operative.

Though this mechanism is specially designed for a hand-drill, it must be understood that any suitable power may be employed. When hand-power is used, the shaft 9 should be provided with a suitable crank 24. As this shaft is rotated the mutilated gear engages the circumferentially-ribbed part 6ª of the plunger and draws the latter back twice for each rotation of the shaft. As soon as each segment of the gear is disengaged from the plunger the spring 8 drives the latter forward, carrying the drill-bit forcibly against the rock. During the backward movement of the plunger the lever 12 is held in engagement with a spiral groove 6ᶜ of the plunger by a suitable spring 25. As soon, however, as the plunger reaches its backward limit of movement a cam 9ª engages the rear extremity of the lever 12 and raises the forward extremity out of the spiral groove and holds the lever in this position until the plunger reaches its forward limit of movement. Hence during each backward stroke the plunger is given a partial rotation, while the forward stroke is made without any rotary action.

The dogs 15, in conjunction with the lever 20, prevent any forward movement of the casing on the rack-bar, except as the drill-bit moves forward into the rock, while the dogs 16 normally prevent any backward movement of the casing on the rack-bar.

Having thus described my invention, what I claim is—

1. In a rock-drill, the combination with a suitable casing, of the reciprocatory plunger having a spirally-grooved portion and a circumferentially-ribbed portion, a shaft carrying a mutilated gear adapted to engage the ribbed portion of the plunger, a spring-held lever adapted to engage the grooved portion of the plunger and impart thereto the partial rotary movement between strokes, and means attached to the shaft and engaging said lever whereby the latter is held out of the spiral groove during the forward movement of the plunger, substantially as described.

2. In a rock-drill, the combination with the casing, a reciprocatory plunger having a spirally-grooved portion, and means for reciprocating the plunger, of a spring-held lever adapted to engage a spiral groove of the plunger during the backward stroke of the latter, and suitable means for lifting said lever out of the said groove during the forward movement of the plunger, substantially as described.

In testimony whereof I affix my signature in the presence of two witnesses.

ALBERT M. PLUMB.

Witnesses:
ALFRED J. O'BRIEN,
G. J. ROLLANDET.